3,077,432
ALIPHATIC PHOSPHONOTHIOATES
John P. Chupp and Joseph W. Baker, Kirkwood, and Peter E. Newallis, Crestwood, Mo., assignors to Monsanto Chemical Company, St. Louis, Mo., a corporation of Delaware
No Drawing. Filed Feb. 2, 1960, Ser. No. 6,113
19 Claims. (Cl. 167—22)

This invention relates to new and useful phosphonothioates and to methods of making same. Additionally, this invention relates to insecticidal compositions containing the new phosphonothioates as an active ingredient.

The new phosphonothioates of this invention can be termed aliphatic phosphonothioates and can be represented by the structure

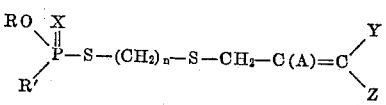

wherein R and R' are like or unlike hydrocarbon radicals (e.g. methyl, ethyl, n-propyl, isopropyl, n-butyl, isobutyl, isoamyl, heptyl, isooctyl, decyl, cyclohexyl, methylcyclohexyl, benzyl, phenethyl, phenyl, tolyl, ethylphenyl, cumyl, naphthyl, and the various isomeric alkyl, cycloalkyl, aralkyl, aryl and alkaryl radical forms thereof which preferably contain for economic reasons not more than 10 carbon atoms) but wherein not more than one of R and R' is an aromatic hydrocarbon radical; wherein X is a chalkogen of atomic weight less than 40 (i.e. sulfur or oxygen); wherein $n$ is a whole number from 1 to 3 inclusive; wherein A is hydrogen or methyl or chlorine or bromine; wherein Y is hydrogen or methyl or chlorine or bromine; and wherein Z is hydrogen or chlorine or bromine. It is preferred that at least one of A, Y and Z be chlorine or bromine but preferably chlorine, and it is preferred that R and R' be like or unlike lower alkyl radicals (that is be methyl, ethyl, n-propyl, isopropyl, isoamyl, n-butyl, isobutyl and the various isomeric alkyl forms thereof containing up to five carbon atoms).

The compounds of this invention can be prepared by reacting in an anhydrous system a salt (i.e. ammonium or alkali metal such as sodium, potassium or lithium salt) of phosphonothioic acid of the structure

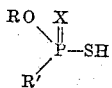

wherein R, R' and X have the aforedescribed significance with a substantially equimolecular proportion of a halide of the structure

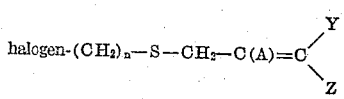

wherein $n$, A, Y and Z have the aforedescribed significance and wherein the term "halogen" means a halogen having an atomic number above 9 but not higher than 35 (i.e. bromine or chlorine, but preferably chlorine) in the presence of an inert organic liquid or solvent (e.g. benzene, toluene, xylene, acetone, methyl ethyl ketone, isopropyl acetate, etc.). While a wide range of reaction temperatures can be employed provided the reaction system is fluid (i.e. the system is maintained above its freezing point and up to and including its boiling point), it is preferred that a reaction temperature in the range of 20° C to 120° C. be employed.

As illustrative of the compounds of this invention is the following:

O-methyl S-(allylthiomethyl) methylphosphonodithioate
O-methyl S-(allylthiomethyl) ethylphosphonothioate
O-methyl S-(allylthiomethyl) ethylphosphonodithioate
O-ethyl S-allylthiomethyl) ethylphosphonothioate
O-ethyl S-[(2-chloroallyl)thiomethyl] ethylphosphonothioate
O-ethylS-[(2-chloroallyl)thiomethyl] ethylphosphonodithioate
O-ethyl S [(2-bromoallyl)thiomethyl] ethylphosphonothioate
O-ethyl C-[(2,3-dichloroallyl)thioethyl) ethylphosphonothioate
O-methyl S-[(3,3-dichloroallyl)thioethyl] ethylphosphonothioate
O-methyl S-[(3-methylallyl)thioethyl] ethylphosphonothiate
O-methyl S-[(3-methyl-3-chloroallyl)thiomethyl] ethylphosphonothioate
O-isopropyl S-[(3,3-dichloroallyl)thiomethyl] methylphosphonodithioate
O-methyl S-[(3-methyl-3-chloroallyl)thioethyl] isobutylphosphonodithioate
O-methyl S-[(2,3,3,-trichloroallyl)thioethyl] ethylphosphonodithioate
O-methyl S-[(2,3,3-trichloroallyl)thiopropyl] ethylphosphonodithioate
O-methyl S-[(3,3-dichloroallyl)thiomethyl] isoamylphosphonodithioate
O-methyl S-[(3,3-dichloroallyl)thiomethyl] cyclohexylphosphonodithioate
O-ethyl S-[(3,3-dichloroallyl)thiomethyl] benzylphosphonodithioate
O-ethyl S-[(2,3-dichloroallyl)thiomethyl] phenylphosphonodithioate
O-phenyl S-[(2-chloroallyl)thioethyl] methylphosphonothioate
O-benzyl S-[(2-chloroallyl)thioethyl] isopropylphosphonothiate
O-methyl S-[(2-methylallyl)thioethyl] ethylphosphonodithioate
O-ethyl S-[(2-methyl-3-chloroallyl)thioethyl] methylphosphonothioate
O-ethyl S-[(2-methyl-3,3-dichloroallyl)thioethyl] methylphosphonothioate As illustrative of the preparation of the compounds of this invention is the following

Example 1

To a suitable reaction vessel equipped with a thermometer, agitator and reflux condenser is charged 15 parts by weight of acetone, 3.68 parts by weight of allylthiomethyl chloride and 5.0 parts by weight of ammonium O-ethyl methylphosphonothiolate. While agitating the mass is heated at 60° C. for 3 hours. The reaction mass is then cooled to room temperature and filtered. The filter cake is then washed with acetone and the washings combined with the original filtrate. This liquid mass is then subjected to vacuum distillation to remove the acetone. The residue is then taken up with methylene chloride and then washed first with 5% aqueous sodium carbonate and then with water. The so-washed organic solution is then subjected to vacuum distillation to remove the solvent. The residue, a yellow oil, is O-ethyl S-(allylthiomethyl) methylphosphonothioate, which is soluble in benzene but insoluble in water.

Employing the above procedure but replacing ammonium O-ethyl methylphosphonothiolate with an equimolecular amount of sodium O-ethyl ethylphosphonothiolate there is obtained O-ethyl S-(allylthiomethyl) ethylphosphonothioate which liquid is soluble in benzene but insoluble in water.

Example II

To a suitable reaction vessel equipped with thermometer, agitator and reflux condenser is charged 80 parts by weight of acetone, 9.51 parts by weight of ammonium O-ethyl methylphosphonodithioate, and 7.88 parts by weight of 2-chloroallylthiomethyl chloride and the charge heated with agitation at 60° C. for 4 hours. The reaction mass is then cooled to room temperature and filtered. The filter cake is then washed with acetone and the washings combined with the original filtrate and the liquid mixture then subjected to vacuum distillation to remove the acetone. This residue is then taken up with methylene chloride and the organic solution washed first with 5% aqueous sodium carbonate and then with water. The so-washed organic solution is then subjected to vacuum distillation to remove the solvent. The residue, an amber oil, is O-ethyl S-[(2-chloroallyl)thiomethyl] methylphosphonodithioate which is soluble in benzene but insoluble in water. Analysis: Theory, Cl 12.8%. Found, Cl 12.3%.

Employing the above procedure but replacing (2-chloroallyl)thiomethyl chloride with an equimolecular amount of (3,3-dichloroallyl)thioethyl chloride there is obtained O-ethyl S-[(3,3-dichloroallyl)thioethyl] methylphosphonodithioate which liquid is soluble in benzene but insoluble in water.

Example III

To a suitable reaction vessel equipped with a thermometer, agitator and reflux condenser is charged 80 parts by weight of acetone, 6.8 parts by weight of (3-chloro-3-methylallyl)thiomethyl chloride and 8.0 parts by weight of ammonium O-methyl methylphosphonodithioate and the mixture heated with agitation for 3 hours at 60° C. The reaction mass is then cooled to room temperature filtered and the filter cake washed with acetone. The washings are combined with the original filtrate and the liquid mixture subjected to vacuum distillation to remove the acetone. The residue is then taken up with methylene chloride and the solution washed first with aqueous sodium carbonate and then with water. The so-washed organic solution is then subjected to vacuum distillation to remove the solvent. The residue, an amber oil, is O-methyl S-[(3-methyl-3-chloro-allyl)thiomethyl] methylphosphonodithioate which is soluble in benzene but insoluble in water. Analysis: Theory, S 34.8%. Found, S 33.7%.

Employing the above procedure but replacing ammonium O-methyl methylphosphonodithioate with an equimolecular amount of sodium O-ethyl isopropylphosphonodithioate there is obtained O-ethyl S-[(3-methyl-3-chlorally)thiomethyl] isopropylphosphonodithioate which liquid is soluble in benzene but insoluble in water.

In the process of this invention any inert organic liquid or mixture of inert organic liquids can be used provided at least one of the reactants is soluble therein. The methods by which the phosphonothioates of this invention are isolated will vary slightly with the reactants employed and the product produced. Further purification by selective solvent extraction or by absorptive agents such as activated carbon or clays can precede the removal of the inert organic liquid or solvent. Additionally an inert organic solvent can be added to and in the purification by absorptive agents. However, the product is generally satisfactory for insecticidal purposes without further purification.

Of the new phosphonothioates of this invention those of the structure

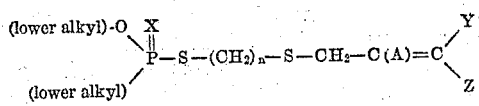

wherein X, n, A, Y and Z have the aforedescribed significance and wherein at least one of A, Y and Z is a halogen (i.e. chlorine or bromine) are particularly useful for insecticidal purposes and of this group those of the said structure wherein X is sulfur, wherein A is hydrogen, wherein Z is halogen (i.e. bromine or chlorine) and wherein Y is methyl are particularly useful in combatting mites. Exemplary of this group of phosphonothioates (in addition to those described hereinbefore) are O-methyl S-[(3-methyl-3-chloroally)thiomethyl] methylphosphonothioate O-methyl S-[(3-methyl-3-bromoallyl)thioethyl] ethylphosphonodithioate O-ethyl S-[(3-methyl-3-chloroallyl)thioethyl] ethylphosphonodithioate O-isopropyl S-[(3-methyl-3-chloroallyl)thiomethyl] methylphosphonothioate O-isopropyl S-[(3-methyl-3-chloroallyl)thiopropyl] methylphosphonodithioate O-isoamyl S-[(3-methyl-3-chloroallyl)thiomethyl] methylphosphonodithioate O-methyl S-[(3-methyl-3-chloroallyl)thioethyl] n-propylphosphonodithioate O-isopropyl S-[(2-chloroallyl)thioethyl] methylphosphonothioate O-isopropyl S-[(2-chloroallyl)thioethyl) methylphosphonodithioate O-isobutyl S-[(3,3-dichloroallyl)thioethyl] methylphosphonodithioate It will be understood that the terms "insect" and "insecticide" are used herein in their broad common usage to include spiders, mites, ticks, and like pests which are not in the strict biological sense classed as insects. Thus the usage herein conforms to the definitions provided by Congress in Public Law 104, the "Federal Insecticide, Fungicide, and Rodenticide Act" of 1947, Section 2, subsection h, wherein the term "insect" is used to refer not only to those small invertebrate animals belonging mostly to the class Insecta, comprising six-legged, usually winged forms as beetles, bugs, bees, flies, and so forth, but also to other allied classes of anthropods whose members are wingless and usually have more than six legs, such as spiders, mites, ticks, centipedes, and wood lice.

The phosphonothioates of this invention are effective against a wide variety of insect pests. As illustrative of the activity not limitative thereof is the following:

One gram of O-ethyl S-(allylthiomethyl) methylphosphonothioate was dissolved in sufficient acetone to make a concentrated solution thereof. Approximately 0.1 cc. of sorbitan monolaurate polyoxyethylene derivative (a commercial water-soluble non-ionic emulsifying agent) is then mixed with the concentrate. To this mixture and with agitation is added sufficient water to provide an aqueous emulsion having a concentration of 0.0016% by weight of O-ethyl S-(allylthiomethyl) methylphosphonothioate. Thereupon lima bean plant leaves previously infested with the two spotted spider mite, *Tetranychus telarius* (L.), are dipped in the aqueous emulsion, withdrawn, and set aside for observation. At the end of 48 hours a 100% kill of the mobile stages of the mite was noted. Seven days after setting the test specimens aside residual activity was confirmed, a 90% kill of both the resting stage and the ova stage being noted. Similar results against the mobile, resting and ova stages of the same mite are obtained employing instead of O-ethyl S-(allylthiomethyl) methylphosphonothioate both O-ethyl S-[(2chloroallyl)thiomethyl] methylphosphonodithioate and O-methyl S-[(3-methyl-3-chloro-allyl)thiomethyl] methylphosphonodithioate respectively at concentrations of 0.0016% by weight.

Employing O - ethyl S - [(2 - chloroallyl)thiomethyl] methylphosphonodithioate, O-methyl S - [(3 - methyl - 3-chloroallyl)thiomethyl] methylphosphonodithioate, respectively at a concentration of 0.16 p.p.m. against yellow fever mosquito larvae, *Aedes aegypti*, a 100% kill was observed.

Systemic activity was also observed against a wide variety of insects. For example against the two-spotted spider mite, *Tetranychus telarius* (L.), a 100% kill was observed employing O-ethyl S-[(2-chloroallyl)thiomethyl] methylphosphonodithioate and O-ethyl S-(allylthiomethyl) methylphosphonothioate at a concentration of 0.004% by weight, respectively.

Although the phosphonothioates of this invention are useful per se in controlling a wide variety of insect pests, it is preferable that they be supplied to the insect pests or to the environment of the insect pest or pests in a dispersed form in a suitable extending agent.

In the instant specification and appended claims it is to be understood that the term "dispersed" is used in its widest possible sense. When it is said that the phosphonothioates of this invention are dispersed, it means that the particles of the phosphonothioates of this invention may be molecular in size and held in true solution in a suitable organic solvent. It means further, that the particles may be colloidal in size and distributed throughout a liquid phase in the form of suspensions or emulsions or in the form of particles held in suspension by wetting agents. It also includes particles which are distributed in a semi-solid viscous carrier such as petrolatum or soap or other ointment base in which they may be actually dissolved in the semi-solid or held in suspension in the semi-solid with the aid of suitable wetting or emulsifying agents. The term "dispersed" also means that the particles may be mixed with and distributed throughout a solid carrier providing a mixture in particulate form, e.g., pellets, granules, powders, or dusts. The term "dispersed" also includes mixtures which are suitable for use as aerosols including solutions, suspensions, or emulsions of the phosphonothioates of this invention in a carrier such a dichlorodifluoromethane and like fluorochloroalkanes which boil below room temperature at atmospheric pressure.

In the instant specification and appended claims it is to be understood that the expression "extending agent" includes any and all of those substances in which the phosphonothioates of this invention are dispersed. It includes, therefore, the solvents of a true solution, the liquid phase of suspensions emulsions or aerosols, the semi-solid carrier of ointments and the solid phase of particulate solids, e.g. pellets, granules, dusts and powders.

The exact concentration of the phosphonothioates of this invention employed in combatting or controlling insect pests can vary considerably provided the required dosage (i.e. toxic or lethal amount) thereof is supplied to the pests or to the environment of the pests. When the extending agent is a liquid or mixture of liquids (e.g. as in solutions, suspensions, emulsions or aerosols), the concentration of the phosphonothiate employed to supply the desired dosage generally will be in the range of 0.001 to 50 percent by weight. When the extending agent is a semi-solid or solid, the concentration of the phosphonothioate employed to supply the desired dosage generally will be in the range of 0.1 to 25 percent by weight. From a practical point of view, the manufacturer must supply the agriculturist with a low-cost concentrate spray base or particulate solid base in such form that, by merely mixing with water or solid extender (e.g. powdered clay or talc) or other low-cost materials available to the agriculturist at the point of use, he will have an easily prepared insecticidal spray or particulate solid. In such a concentrated composition, the phosphonothioate generally will be present in a concentration of 5 to 95 percent by weight, the residue being any one or more of the well-known insecticidal adjuvants, such as the various surface-active agents (e.g., detergents, a soap or other emulsifying or wetting agent, surface-active clays), solvents, diluents, carrier media, adhesives, spreading agents, humectants, and the like.

There are a large number of organic liquids which can be used for the preparation of solutions, suspensions, or emulsions of the phosphonothioates of this invention. For example, isopropyl ether, acetone, methyl ethyl ketone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g. those boiling almost entirely under 400° F. at atmospheric pressure and having a flash point above about 80° F., particularly kerosene), mineral oils having an unsulfonatable residue above about 80 percent and preferably above about 90 percent. In those instances wherein there may be concern about the phytotoxicity of the organic liquid extending agent a portion of same can be replaced by such low molecular weight aliphatic ethers and the aliphatic ketones containing not more than about 10 carbon atoms as exemplified by acetone, methyl ethyl ketone, diisobutyl ketone, dioxane, isopropyl ether, and the like. In certain instances, it is advantageous to employ a mixture of organic liquids as the extending agent.

When the phosphonothioates of this invention are to be supplied to the insect pests or to the environment of the pests as aerosols, it is convenient to dissolve them in a suitable solvent and disperse the resulting solution in dichlorodifluoromethane or like chlorofluoroalkane which boils below room temperature at atmospheric pressure.

The phosphonothioates of this invention are preferably supplied to the insect pests or to the environment of the insect pests in the form of emulsions or suspensions. Emulsions or suspensions are prepared by dispersing the phosphonothioates of this invention either per se or in the form of an organic solution thereof in water with the aid of a water-soluble surfactant. The term "surfactant" as employed here and in the appended claims is used as in volume II of Schwartz, Perry, and Berch's "Surface Active Agents and Detergents" (1958, Interscience Publishers, Inc., New York) in place of the expression "emulsifying agent" to connote generically the various "emulsifying agents," "dispersing agents," "wetting agents," and "spreading agents" that are adapted to be admixed with the active compounds of this invention in order to secure better wetting and spreading of the active ingredients in the water vehicle or carrier in which they are insoluble through lowering the surface tension of the water (see also Frear, "Chemistry of Insecticides, Fungicides and Herbicides," second edition, page 280). These surfactants include the well-known capillary-active (or cationic), or non-ionizing (or non-ionic), cation-active (or cationic), or non-ionizing (or non-ionic) which are described in detail in volumes I and II of Schwartz, Perry, and Berch's "Surface Active Agents and Detergents" (1958, Interscience Publishers, Inc., New York) and also in the November 1947 issue of Chemical Industries (pages 811–824) in an article entitled "Synthetic Detergents," by John W. McCutcheon, and also in the July, August, September and October 1952 issues of Soap and Sanitary Chemicals under the title "Synthetic Detergents." The disclosures of these articles with respect to surfactants, i.e. the anion-active, cation-active and non-ionizing capillary active substances, are incorporated in this specification by reference in order to avoid unnecessary enlargement of this specification. The preferred surfactants are the water soluble anionic surface-active agents and the water-soluble non-ionic surface active agents set forth in U.S. 2,846,398 (issued August 5, 1958). In general it is preferred that a mixture of water soluble anionic and water soluble non-ionic surfactants be employed.

The phosphonothioates of this invention can be dispersed by suitable methods (e.g., tumbling or grinding) in solid extending agents either of organic or inorganic nature and supplied to the insect pest environment in particulate form. Such solid materials include, for example, tricalcium phosphate, calcium carbonate, kaolin, bole, kieselguhr, talc, bentonite, fuller's earth, pyrophillite, diatomaceous earth, calcined magnesia, volcanic ash, sulfur and the like inorganic solid materials, and include for example, such materials of organic nature as powdered cork, powdered wood, and powdered walnut shells. The preferred solid carriers are the adsorbent clays, e.g. bentonite. These mixtures can be used for insecticidal purposes in the dry form, or, by addition of water-soluble surfactants or wetting agents the dry particulate solids can be rendered wettable by water so as to obtain stable aqueous dispersions or suspensions suitable for use as sprayable compositions.

For special purposes the phosphonothioates of this invention can be dispersed in a semi-solid extending agent such as petrolatum or soap (e.g., sodium stearate or oleate or palmitate or mixtures thereof) with or without the aid of solubility promoters and/or surfactants or dispersing agents.

In all of the forms described above the dispersions can be provided ready for use in combatting insect pests or they can be provided in a concentrated form suitable for mixing with or dispersing in other extending agents. As illustrative of a particularly useful concentrate is an intimate mixture of phosphonothioates of this invention with a water-soluble surfactant which lowers the surface tension of water in the weight proportions of 0.1 to 15 parts of surfactant with sufficient of the phosphonothioate of this invention to make 100 parts by weight. Such a concentrate is particularly adapted to be made into a spray for combatting various forms of insect pests (particularly mites) by the addition of water thereto. As illustrative of such a concentrate is an intimate mixture of 95 parts by weight of O-ethyl S-[(2-chloroallyl)thiomethyl] methylphosphonodithioate and 5 parts by weight of a water-soluble non-ionic surfactant such as the polyoxyethylene derivative of sorbitan monolaurate.

Another useful concentrate adapted to be made into a spray for combatting insect pests (particularly mites) is a solution (preferably as concentrated as possible) of a phosphonothioate of this invention in an organic solvent therefor. The said liquid concentrate preferably contains dissolved therein a minor amount of (e.g., 0.5 to 10 percent by weight of the weight of the new insecticidal agent) of a surfactant (or emulsifying agent), which surfactant is also water-soluble. As illustrative of such a concentrate is a solution of O-methyl S-[(3-methyl - 3 - chloro-allyl)thiomethyl] methylphosphonodithioate in benzene which solution contains dissolved therein a water-soluble alkylaryl sulfonate anionic surfactant.

Of the surfactants aforementioned in preparing the various emulsifiable, wettable or dispersible compositions or concentrates of this invention, the anionic and non-ionic surfactants are preferred. Of the anionic surfactants, the particularly preferred are the well known water-soluble alkylaryl sulfonates as exemplified by sodium decylbenzene sulfonate and sodium dodecylbenzene sulfonate. Of the non-ionic surfactant, the particularly preferred are water-soluble polyoxyethylene derivatives of alkylphenols (particularly isooctylphenol) and the water-soluble polyoxyethylene derivatives of the mono-higher fatty acid esters of sorbitan.

In all of the various dispersions described hereinbefore for insecticidal purposes, the active ingredient can be one or more of the compounds of this invention. The compounds of this invention can also be advantageously employed in combination with other pesticides, including, for example, nematocides, bactericides, fungicides, and herbicides. In this manner it is possible to obtain mixtures which are effective against a wide variety of other forms of noxious life.

In controlling or combatting insect pests the phosphonothioates of this invention either per se or compositions comprising same are supplied to the insect pests or to their environment in a lethal or toxic amount. This can be done by dispersing the new insecticidal agent or insecticidal composition comprising same in, on or over an infested environment or in, on or over an environment the insect pests frequent, e.g. agricultural soil or other growth media or other media infested with the insect pests or attractable to the pests for habitational or sustenance or propagational purposes, in any conventional fashion which permits contact between the insect pests and the phosphonothioates of this invention. Such dispersing can be brought about by applying the new phosphonothioates per se or sprays or particulate solid compositions containing same to a surface infested with the insect pests or attractable to the pests, as for example, the surface of an agricultural soil or other media such as the above ground surface of plants by any of the conventional methods, e.g. power dusters, boom and hand sprayers, and spray dusters. Also for sub-surface application such dispersing can be carried out by simply mixing the new insecticidal agent per se or insecticidal spray or particulate solid compositions comprising same with the infested environment or with the environment the insect pests frequent, or by employing a liquid carrier for the new insecticidal agent to accomplish sub-surface penetration and impregnation thereof therein.

While this invention has been described with respect to certain embodiments, it is to be understood that it is not so limited and that variations and modifications thereof obvious to those skilled in the art can be made without departing from the spirit or scope thereof.

What is claimed is:
1. A phosphonothioate of the structure

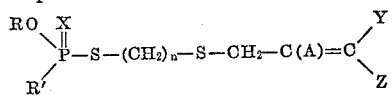

wherein R and R' are hydrocarbon radicals containing not more than 10 carbon atoms and are selected from the group consisting of alkyl, cycloalkyl, aralkyl, aryl and alkaryl radicals but wherein not more than one of R and R' is an aromatic hydrocarbon radical; wherein X is a chalkogen of atomic weight less than 40; wherein $n$ is a whole number from 1 to 3, inclusive; wherein A is selected from the group consisting of hydrogen, methyl, and halogen; wherein Y is selected from the group consisting of hydrogen, halogen, and methyl; wherein Z is selected from the group consisting of hydrogen and halogen; and wherein the term "halogen" means a halogen having an atomic number above 9 but not higher than 35.

2. A phosphonothioate of claim 1 wherein R and R' are lower alkyl radicals.

3. A phosphonodithioate of the structure

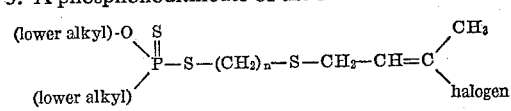

wherein the term "halogen" means a halogen having an atomic number above 9 but not higher than 35 and wherein $n$ is a whole number from 1 to 3 inclusive.

4. O-ethyl S-(allylthiomethyl) methylphosphonothioate.
5. O-ethyl S-[(2chloroallyl)thiomethyl] methylphosphonodithioate.
6. O - methyl S - [(3 - methyl - 3 - chloroallyl)thiomethyl] methylphosphonodithioate.
7. The method of making the compounds of claim 3 which comprises reacting in an anhydrous system a salt of an acid of phosphorus of the structure.

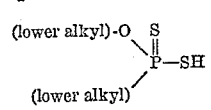

with a substantially equimolecular amount of a halide of the structure

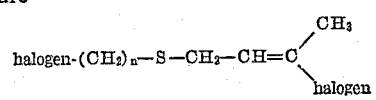

wherein the respective terms "halogen" mean a halogen having an atomic number above 9 but not higher than 35 and wherein $n$ is a whole number from 1 to 3, inclusive, the salt forming group of said acid reactant being selected from the group consisting of ammonium and alkali metals.

8. The method of making the compounds of claim 1 which comprises reactinng in an anhydrous system a salt of an acid of phosphorus of the structure

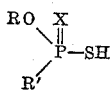

wherein R, R' and X have the same significance as in claim 1 with a substantially equimolecular amount of a halide of the structure

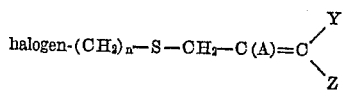

wherein $n$, A, Y and Z have the same significance as in claim 1 and wherein the term "halogen" means a halogen having an atomic number above 9 but not higher than 35, in the presence of an inert organic liquid, the salt forminng group of the said acid reactant being selected from the group consisting of ammonium and alkali metals.

9. The method of claim 8 wherein R and R' are lower alkyl radicals, which method provides the compounds of claim 2.

10. An insecticidal composition comprising a compound of claim 1 dispersed in an extending agent.

11. An insecticidal composition comprising a compound of claim 1 dispersed in an extending agent, the composition containing 0.1 to 25 percent by weight of said compound of claim 1, the said extending agent being selected from the group consisting of solid and semi-solid extending agents.

12. An insecticidal composition comprising a compound of claim 1 dispersed in a liquid extending agent, the composition containing 0.001 to 50 percent by weight of said compound of claim 1.

13. An insecticidal concentrate adapted to be made into a sprayable composition by the addition of water comprising a compound of claim 1 in admixture with a water-soluble surfactant in the weight proportion of 0.1 to 15 parts of surfactant and sufficient of said compound of claim 1 to make 100 parts by weight.

14. An insecticidal composition comprising a compound of claim 3 dispersed in an adsorbent clay, the composition containing 0.1 to 25 percent by weight of said compound of claim 3.

15. An insecticidal concentrate comprising a compound of claim 3 and an insecticidal adjuvant, said concentrate containing from 5 to 95 percent by weight of the compound of claim 3.

16. An insecticidal concentrate comprising a compound of claim 3 dispersed in an organic solvent therefor and having dissolved therein a minor amount of a surfactant, said concentrate forming an emulsion with water upon agitation therewith.

17. The method of controlling insects which comprises contacting the insects with a toxic amount of a compound of claim 1.

18. The method of controlling insects which comprises contacting the insects with a toxic amount of a compound of claim 3.

19. The method for protection of plants against insect attack which comprises applying to the plant an insecticidal amount of at least one compound of claim 3.

References Cited in the file of this patent
UNITED STATES PATENTS

| | | |
|---|---|---|
| 2,668,822 | Tolkmith | Feb. 9, 1954 |
| 2,891,059 | Malz | Jan. 16, 1959 |
| 2,907,787 | Hoffmann | Oct. 6, 1959 |
| 2,915,429 | Scherer | Dec. 1, 1959 |
| 2,920,993 | Fairchild | Jan. 12, 1960 |
| 2,962,520 | Schrader | Nov. 29, 1960 |